United States Patent [19]

Engel et al.

[11] 3,859,338

[45] Jan. 7, 1975

[54] DERIVATIVES OF 4-(4'-BIPHENYLYL)-3-OR-2-BUTENOIC ACID AND SALTS THEREOF

[75] Inventors: Wolfhard Engel, Ernst Seeger, Helmut Teufel; Günther Engelhardt, all of Biberach, Riss, Germany

[73] Assignee: Boehringer Ingelheim GmbH, Ingelheim am Rhein, Germany

[22] Filed: Sept. 14, 1972

[21] Appl. No.: 289,008

[30] Foreign Application Priority Data

Feb. 8, 1972  Germany............................ 2205732

[52] U.S. Cl..... 260/501.16, 260/348 R, 260/465 D, 260/465 K, 260/469, 260/501.1, 260/515 R, 260/515 A, 260/518 R, 260/519, 260/558 R, 260/599, 260/247, 424/308, 424/309, 424/316, 424/317, 424/324, 260/247.2 R

[51] Int. Cl............................................ C07c 63/00

[58] Field of Search....... 260/501.16, 515 A, 515 R, 260/501.1, 247.2 R

[56] References Cited

UNITED STATES PATENTS

| | | | |
|---|---|---|---|
| 3,624,142 | 11/1971 | Shen et al................. | 260/501.16 X |
| 3,655,743 | 4/1972 | Nickl et al................ | 260/515 A X |
| 3,755,427 | 8/1973 | Adams et al.............. | 260/515 A |

FOREIGN PATENTS OR APPLICATIONS 611,972  11/1960  Italy

OTHER PUBLICATIONS

Cavallini et al., J. Am. Chem. Soc., Vol. 79, pp. 3514–3517, (1957).

Primary Examiner—Bernard Helfin
Assistant Examiner—Michael W. Glynn
Attorney, Agent, or Firm—Hammond & Littell

[57]  ABSTRACT

Compounds of the formula

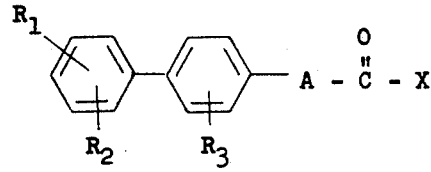

wherein $R_1$ and $R_3$, may be identical to or different from each other, are each hydrogen or halogen, $R_2$ is halogen, nitro, cyano, amino, (alkanoyl of 1 to 4 carbon atoms)-amino or, when $R_3$ is halogen, also hydrogen, A is $-C(R_4)=CH-CH_2-$ or $-CH(R_4)-CH=CH-$, where $R_4$ is hydrogen or alkyl of 1 to 2 carbon atoms, and X is hydroxyl, alkoxy of 1 to 4 carbon atoms or

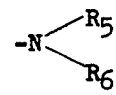

where $R_5$ and $R_6$, which may be identical to or different from each other, are each hydrogen or alkyl of 1 to 3 carbon atoms, or one is hydroxyphenyl and the other is hydrogen, and, when X is —OH, non-toxic, pharmacologically acceptable salts thereof; the compounds as well as the salts are useful as antiphlogistics.

13 Claims, No Drawings

DERIVATIVES OF 4-(4'-BIPHENYL)-3-OR-2-BUTENOIC ACID AND SALTS THEREOF

This invention relates to novel derivatives of 4-(4'-biphenylyl)-3- or -2-butenoic acid and salts thereof, as well as to various methods of preparing these compounds.

More particularly, the present invention relates to a novel class of compounds represented by the formula

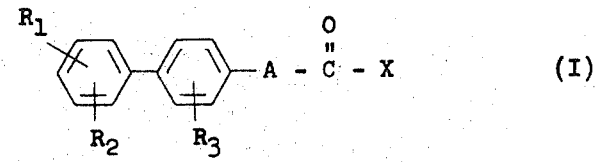

wherein
- $R_1$ and $R_3$, which may be identical to or different from each other, are each hydrogen or halogen,
- $R_2$ is halogen, nitro, cyano, amino, (alkanoyl of 1 to 4 carbon atoms)-amino or, when $R_3$ is halogen, also hydrogen,
- A is $-C(R_4)=CH-CH_2-$ or $-CH(R_4)-CH=CH-$, where $R_4$ is hydrogen or alkyl of 1 to 2 carbon atoms, and
- X is hydroxyl, alkoxy of 1 to 4 carbon atoms or

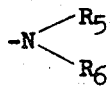

where $R_5$ and $R_6$, which may be identical to or different from each other, are each hydrogen or alkyl of 1 to 3 carbon atoms, or one is hydroxyphenyl and the other is hydrogen, and, when X is —OH, non-toxic, pharmacologically acceptable salts thereof.

The compounds embraced by formula I may be prepared by the following methods:

METHOD A

For the preparation of a free acid of the formula I, i.e. where X is hydroxyl, by dehydrating a 4-(4'-biphenylyl)-4-hydroxy-butyric acid compound of the formula

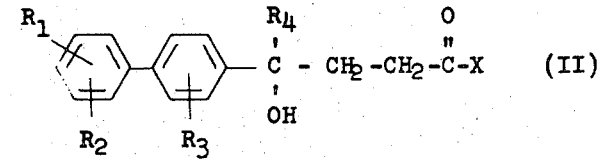

wherein $R_1$, $R_2$, $R_3$, $R_4$ and X have the same meanings as in formula I, a salt thereof or a lactone thereof of the formula

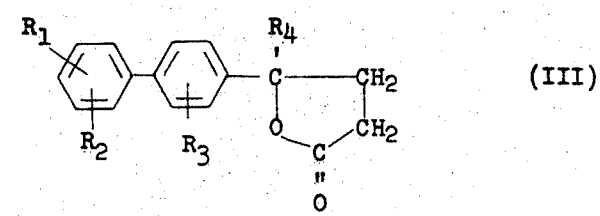

where $R_1$, $R_2$, $R_3$ and $R_4$ have the meanings defined above, in the presence of a hydrohalic acid addition salt of a tertiary organic base.

The dehydration is effected by heating the reaction mixture to a temperature between 140° and 200°C. In some cases it is of advantage to carry out the dehydration in the presence of an inert, organic, high-boiling-point solvent, such as tetrahydronaphthalene. Examples of tertiary organic bases the hydrohalic acid addition salts of which may be used include pyridine, N-alkyl pyridines, N,N-dialkyl-anilines and N-alkyl-piperidines; especially preferred is pyridine hydrochloride. Examples of preferred hydrohalic acids for formation of addition salts with the tertiary organic bases are hydrochloric acid or hydrobromic acid.

The fact that the dehydration of a compound of the formula II or III under these conditions would lead to the formation of a butenoic acid derivative of the formula I was unexpected, because the treatment of a compound of the formula II under analogous conditions normally leads only to the formation of a lactone of the formula III.

METHOD B

For the preparation of a compound of the formula I wherein $R_1$ and $R_3$ have the meanings defined above, $R_2$ has the meanings defined above except nitro or cyano, A is $-CH=CH-CH_2-$ or $-CH_2-CH=CH-$, and X is hydroxyl, by reducing a 4-(4'-biphenylyl)-4-hydroxy-crotonic acid of the formula

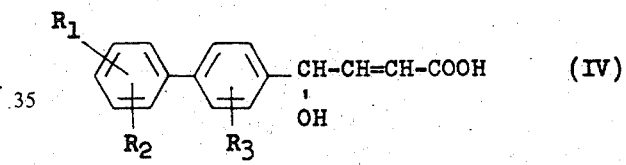

wherein $R_1$ and $R_3$ have the meanings defined in connection with formula I and $R_2$ has the same meanings as in formula I except cyano, with nascent hydrogen generated by a mixture of a mineral acid, such as hydrochloric acid, and zinc or amalgamated zinc, preferably in the presence of an inert organic solvent, such as toluene or xylene, at a temperature between 50° and 150°C. If $R_2$ in the starting compound IV is nitro, this substituent is simultaneously reduced to amino.

It was entirely unexpected that this reduction would lead to the formation of a corresponding butenoic acid instead of to a corresponding butyric acid, in view of the fact that it is known (see copending application Ser. No. 234,346, filed Mar. 13, 1972) that, on the one hand, a 4-(4'-biphenylyl)-4-hydroxy-crotonic acid of the formula IV is isomerized into a corresponding 4-(4'-biphenylyl)-4-oxo-butyric acid upon treatment with a mineral acid and, on the other hand, a 4-(4'-biphenylyl)-4-oxo-butyric acid can be reduced to a corresponding 4-(4'-biphenylyl)-butyric acid by the method of Clemmensen, i.e. with amalgamated zinc in the presence of hydrochloric acid, for example.

The reaction products of methods A and B are generally mixtures consisting principally of the transform of the desired 4-(4'-biphenylyl)-3-butenoic acid and minor amounts of the cis-form of the corresponding 4-(4'-biphenylyl)-3-butenoic acid and the trans-form of the corresponding 4-(4'-biphenylyl)-2-butenoic acid. Such mixture may readily be separated into their individual components by known methods, such as by column-chromatography or fractional crystallization from an inert solvent. By trans-4-(4'-biphenylyl)-3-butenoic acids we mean those compounds wherein the biphenylyl group and the methylene group having the carboxyl radical attached thereto are in trans-configuration with respect to the olefinic double bond.

METHOD C

By subjecting an aldehyde of the formula

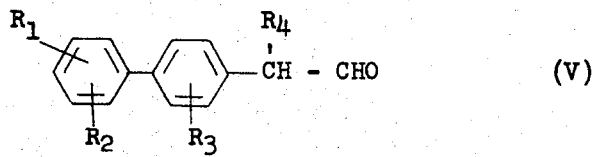

wherein $R_1$, $R_2$, $R_3$ and $R_4$ have the same meanings as in formula I, to a condensation reaction with malonic acid or an ester thereof in the presence of an acid or weakly basic catalyst and, if necessary, subsequently subjecting the intermediate reaction product to acid hydrolysis and/or decarboxylation, whereby a free acid of the formula I wherein A is —CH($R_4$)—CH=CH— is formed.

On the other hand, if the above condensation is carried out with malonic acid in the presence of pyridine and piperidine, initially at room temperature and later at elevated temperatures up to the boiling point of pyridine, the initially formed acid of the formula I wherein A is —CH($R_4$)—CH=CH— is entirely or partially converted or isomerized in situ into the corresponding acid of the formula I wherein A is —C($R_4$)=CH—$CH_2$—.

A more reliable way of effecting the conversion or isomerization above referred to is to heat the initially formed 4-(4'-biphenylyl)-2-butenoic acid with a strong alkali. Especially preferred for this purpose are treatment with potassium tert.butylate in dry tert.butanol and heated with high-percentage aqueous sodium hydroxide or potassium hydroxide in pyridine. Particularly pure end products are obtained when this conversion or isomerization is performed in an atmosphere of an inert protective gas, such as nitrogen.

METHOD D

A compound of the formula I wherein X is alkoxy may be prepared by conventional esterification procedures, that is, for instance, by reacting a compound of the formula I wherein X is hydroxyl with an alkanol of 1 to 4 carbon atoms in the presence of an acid catalyst, such as hydrochloric acid or sulfuric acid; or by treating the free starting acid with a corresponding chlorocarbonic lower alkyl ester, whereby the desired 4-(4'-biphenylyl)-butenoic acid lower alkyl ester of the formula I is spontaneously formed, accompanied by release of carbon dioxide.

METHOD E

A compound of the formula I wherein X is —$NR_5R_6$, where $R_5$ and $R_6$ have the same meanings as in formula I, may be obtained by reacting a compound of the formula I wherein X is halogen, especially chlorine or bromine, or lower alkoxy with an amine of the formula

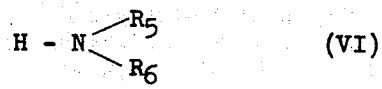

In those instances where the end products of methods D and E are mixtures of the cis- and trans-forms of 4-(4'-biphenylyl)-3- and 2-butenoic acid compounds, such mixtures may be separated very simply into their individual components, especially be fractional crystallization from an inert solvent.

METHOD F

A compound of the formula I wherein $R_2$ is amino may be prepared by subjecting a compound of the formula I wherein $R_2$ is lower alkanoyl-amino to alkaline hydrolysis, such as by heating with an aqueous alkali metal hydroxide.

Those compounds of the formula I wherein X is hydroxyl may, if desired, by converted by known method into salts thereof with pharmaceutically acceptable bases, such as their alkali metal or alkaline earth metal salts or addition salts with organic bases. Examples of non-toxic, pharmacologically acceptable addition salts include those formed with cyclohexylamine, isobutylamine, morpholine, ethanolamine, diethanolamine or dimethylaminoethanol.

The starting compounds of the formula II for method A, wherein $R_4$ is hydrogen and X is hydroxyl or alkoxy, may be prepared by reducing a 4-(4'-biphenylyl)-4-oxo-butyric acid of the formula

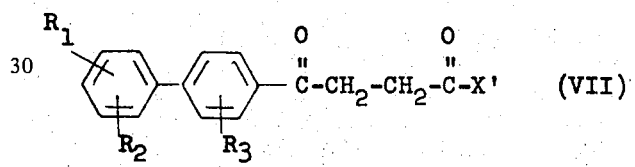

wherein $R_1$, $R_2$ and $R_3$ have the same meanings as in formula I and X' is hydroxyl or alkoxy of 1 to 4 carbon atoms, with sodium borohydride, preferably in a solvent, such as ethanol, at a temperature between 0° and 45°C.

A compound of the formula VII, in turn, may be obtained for example, by catalytic hydrogenation of a 4-(4'-biphenylyl)-4-oxo-crotonic acid of the formula

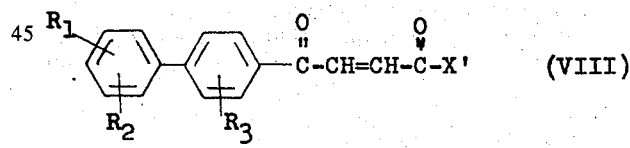

wherein $R_1$, $R_2$, $R_3$ and X' have the meanings defined in connection with formula VII, in the presence of a catalyst, such as Raney nickel or palladized barium sulfate, and of a solvent, such as ethanol or ethyl acetate, at a hydrogen pressure of 1 to 5 atmospheres and a temperature between 0° and 60°C.

A compound of the formula VIII, in turn, may be prepared by condensation of a correspondingly substituted 4-biphenylyl-methyl ketone with glyoxylic acid hydrate in the presence of an acid, such as formic acid or acetic acid.

The 4-(4'-biphenylyl)-4-hydroxy-butyric acids of the formula II readily convert into the corresponding lactones of the formula III in the presence of a mineral acid.

The starting compounds of the formula II, wherein $R_1$ and $R_3$ have the meanings previously defined, $R_2$ has the meanings previously defined except nitro, $R_4$ is methyl or ethyl, and X is hydroxyl, may be obtained by conventional methods from the correspondingly substituted lactones of the formula III. These lactones, in turn, may be prepared by condensation of a succinic acid ester with a correspondingly substituted 4-biphenylyl-alkyl ketone of the formula

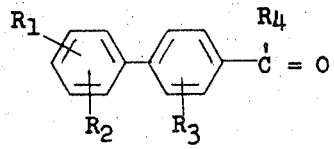 (IX)

wherein $R_1$ through $R_4$ have the meanings defined in the preceding sentence, in the presence of an alkali metal alcoholate, followed by hydrolysis or decarboxylation of the semi-ester intermediate [see W. S. Johnson and G. H. Daub, Organic Reactions 6, 1 (1951)].

The starting compounds of the formula IV for method B may be obtained, for example, by reducing a 4-(4'-biphenylyl)-4-oxo-crotonic acid compound of the formula VIII with sodium borohydride in an aqueous alkaline medium.

The aldehyde starting compounds of the formula V for method C may be obtained, for example, by glycide ester condensation according to Darzens-Erlenmeyer-Claisen [cf. H. Krauch and W. Kunz, Namenreaktionen der Organischen Chemie, 1st Edition, pg. 112, published by Dr. Alfred Hüthig-Verlag G.m.b.H., Heidelberg, Germany (1961)]; or, when $R_4$ is methyl or ethyl, also by isomerization of an oxirane of the formula

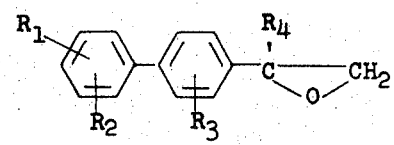 (X)

wherein $R_1$, $R_2$ and $R_3$ have the same meanings as in formula I and $R_4$ is methyl or ethyl, in the presence of borontrifluoride etherate.

An oxirane of the formula X, in turn, may be obtained, for instance, by treating a ketone of the formula IX with dimethylsulfonium methylide.

The following examples further illustrate the present invention and will enable others skilled in the art to understand it more completely. It should be understood, however, that the invention is not limited solely to the particular examples given below.

EXAMPLE 1

Trans-4-(2''-fluoro-4'-biphenylyl)-3-butenoic acid by method B 15 ml of water, 35 ml of concentrated hydrochloric acid, 50 ml of toluene and 10 gm of sodium 4-(2''-fluoro-4'-biphenylyl)-4-hydroxy-crotonate (m.p. of the free acid: 109°–111°C) were added to 20 gm of amalgamated zinc (Org. Syntheses, Coll. Vol. III, pg. 786), and the mixture was refluxed for 6 hours while stirring; after 3 hours of refluxing an additional 10 ml of concentrated hydrochloric acid were added. Thereafter, unreacted zinc was separated by vacuum filtration, and the filtrate was extracted 3 times with 10 ml each of ether. The ethereal extracts were combined and evaporated, and the residue was recrystallized from cyclohexane/ethyl acetate, yielding 8 gm (92% of theory) of a colorless substance having a melting point of 142°–144°C, which was identified to be the trans-form of the compound of the formula

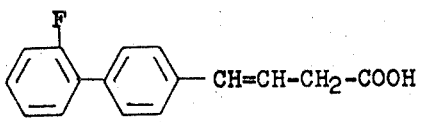

NMR-spectrum in deuterochloroform:
1 olefinic H at 6.6 ppm (J = 15 cycles/sec)
1 olefinic H at 6.35 ppm (J = 15 and 6 cycles/sec)
1 $CH_2$ at 3.3 ppm (J = 6 cycles/sec).

The free acid thus obtained was dissolved in ethyl acetate, cyclohexylamine was added to the solution, and the precipitate formed thereby was collected and recrystallized from absolute ethanol, yielding the cyclohexylamine salt which had a melting point of 181°–182°C. The sodium salt, prepared by treating the free acid with the calculated amount of sodium bicarbonate, had a melting point of 310°–312°C.

EXAMPLE 2

Using a procedure analogous to that described in Example 1, 74% of theory of trans-4-(2''-chloro-4'-biphenylyl)-3-butenoic acid, m.p. 127°–128°C (recrystallized from cyclohexane), was obtained from 4-(2''-chloro-4'-biphenylyl)-4-hydroxy-crotonic acid (m.p. 105°–107°C).

The sodium salt of the butenoic acid had a melting point beginning at 285°C (decomp.).

EXAMPLE 3

Using a procedure analogous to that described in Example 1, 75% of theory of trans-4-(2''-bromo-4'-biphenylyl)-3-butenoic acid was obtained from the morpholine salt of 4-(2''-bromo-4'-biphenylyl)-4-hydroxy-crotonic acid (m.p. 147°–148°C).

The cyclohexylamine salt of the butenoic acid, precipitated from acetone, had a melting point of 167°–169°C.

EXAMPLE 4

Trans-4-(2''-amino-4'-biphenylyl)-3-butenoic acid by methods B and F a. Using a procedure analogous to that described in Example 1, 40% of theory of trans-4-(2''-acetamido-4'-biphenylyl)-3-butenoic acid, m.p. 152°–154°C, of the formula

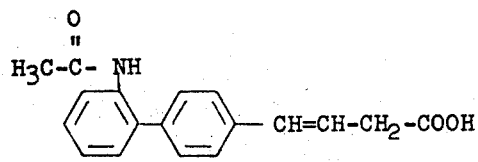

was obtained from the cyclohexylamine salt of 4-(2''-acetamido-4'-biphenylyl)-4-hydroxy-crotonic acid, m.p. 130°C (decomp.).

b. A mixture consisting of 44 gm of trans-4-(2''-acetamido-4'-biphenylyl)-3-butenoic acid and 300 ml of aqueous 20% potassium hydroxide was heated for 9 hours on a boiling water bath. Thereafter, the reaction mixture was diluted with 700 ml of water and then made weakly acid with formic acid. The precipitate formed thereby was collected by vacuum filtration and recrystallized from aqueous 60% methanol, yielding 26 gm (69% of theory) of the trans-form of the compound of the formula

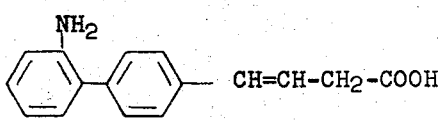

which had a melting point of 147°–149°C.

Its cyclohexylamine salt had a melting point of 172°–174°C after recrystallization from ethyl acetate/isopropanol.

EXAMPLE 5

Using a procedure analogous to that described in Example 1, 63% of theory of trans-4-(4''-chloro-4'-biphenylyl)-3-butenoic acid, m.p. 187°–188°C (recrystallized from cyclohexane/ethyl acetate), was obtained from the cyclohexylamine salt of 4-(4''-chloro-4'-biphenylyl)-4-hydroxy-crotonic acid [m.p. 197°–198°C (decomp.)].

The cyclohexylamine salt of the butenoic acid had a melting point of 198°–200°C (recrystallized from ethanol).

EXAMPLE 6

Trans-4-(2''-fluoro-4'-biphenylyl)-3-butenoic acid, cis-4-(2''-fluoro-4'-biphenylyl)-3-butenoic acid and trans-4-(2''-fluoro-4'-biphenylyl)-2-butenoic acid by method A A mixture consisting of 13.7 gm of 4-(2''-fluoro-4'-biphenylyl)-4-hydroxy-butyric acid (m.p. 120°–122°C) and 41 gm of pyridine hydrochloride was heated for 3.5 hours on an oil bath at 180°C, accompanied by stirring. Thereafter, the reaction mixture was allowed to cool and was then admixed with 400 ml of water and 50 ml of concentrated hydrochloric acid. The precipitate formed thereby was taken up in 300 ml of ether, the resulting solution was washed with water and dried over sodium sulfate, and then cyclohexylamine was added until no more precipitation occurred. The collected precipitate (12.8 gm) consisted of a mixture of the cyclohexylamine salts of the three acids named in the heading.

The mixture of salts thus obtained was admixed with hydrochloric acid, and the mixture of free acids formed thereby was recrystallized from 75 ml of ethyl acetate, yielding 49% of theory of trans-4-(2''-fluoro-4'-biphenylyl)-3-butenoic acid, m.p. 142°–144°C.

The mother liquor of the recrystallization was evaporated to one-third of its original valume, whereby an additional 10% of theory of the trans-acid was recovered by filtration, the filtrate was evaporated to dryness, and the residue was recrystallized from a 1:1-mixture of petroleum ether and cyclohexane, yielding 5% of theory of a mixture of cis- and trans-4-(2''-fluoro-4'-biphenylyl)-butenoic acids which had a melting point of 68°–70°C. This mixture consisted of the following components:

10% by weight of trans-4-(2''-fluoro-4'-biphenylyl)-3-butenoic acid [NMR-spectrum in deuterochloroform: Signals at 6.6 ppm (J = 15 cycles/sec), 6.35 ppm (J = 15 and 6 cycles/sec) and 3.3 ppm (J = 6 cycles/sec) in the ratio 1:1:2];

50% by weight of cis-4-(2''-fluoro-4'-biphenylyl)-3-butenoic acid [NMR-spectrum in deuterochloroform: Signals at 6.6 ppm (J = 11 and 2 cycles/sec), 5.9 ppm (J = 11 and 7 cycles/sec) and 3.4 ppm (J = 7 and 2 cycles/sec) in the ratio 1:1:2]; and 40% by weight of trans-4-(2''-fluoro-4'-biphenylyl)-2-butenoic acid [NMR-spectrum in deuterochloroform: Signals at 5.9 ppm (J = 15 and 1 cycles/sec), 7.1 ppm (J = 15 cycles/sec) and 3.6 ppm (J = 6 and 1 cycles/sec) in the ratio 1:1:2].

EXAMPLE 7

Trans-4-(2'',3''-dichloro-4'-biphenylyl)-3butenoic acid and its cyclohexylamine salt by method A A mixture consisting of 16 gm of 4-(2'',3''-dichloro-4'-biphenylyl)-4-hydroxy-butyric acid [m.p. 134°–135°C (decomp.)] and 48 gm of pyridine hydrochloride was heated for three hours at 160°–170°C, accomapnied by stirring. Thereafter, the reaction mixture was allowed to cool, then 300 ml of water and 30 ml of concentrated hydrochloric acid were added, and the precipitate formed thereby was taken up in 300 ml of ether. The resulting solution was extracted several times with water, dried over sodium sulfate, and then cyclohexylamine was added to the dry ethereal solution until no more precipitation occurred. The precipitated cyclohexylamine salt of trans-4-(2'',3''-dichloro-4'-biphenylyl)-3-butenoic acid (m.p. 168°C) was collected by vacuum filtration, suspended in water, and the aqueous suspension was admixed with dilute hydrochloric acid. The precipitate formed thereby was collected and recrystallized from ethyl acetate/cyclohexane, yielding 75% of theory of the trans-form of the compound of the formula

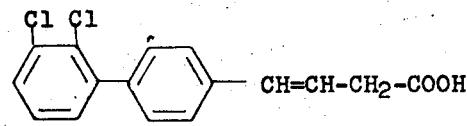

which had a melting point of 165°C.

EXAMPLE 8

Trans-4-(2''-fluoro-4'-biphenylyl)-3-butenoic acid amide by method E

A solution of 2.7 gm of trans-4-(2''-fluoro-4'-biphenylyl)-3-butenoic acid chloride in 25 ml of acetone was added dropwise to 50 ml of aqueous 30% ammonia while stirring and cooling the latter. The resulting mixture was stirred for 10 minutes more and then diluted with 100 ml of water, and the precipitate formed thereby was collected and recrystallized from cyclohexane/ethyl acetate, yielding 1.5 gm (60% of theory) of the trans-form of the compound of the formula

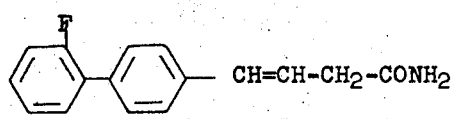

which had a melting point of 130°–131°C.

EXAMPLE 9

Trans-4-(2''-fluoro-4'-biphenylyl)-3-butenoic acid methylamide by method E

A solution of 2.7 gm of trans-4-(2''-fluoro-4'-biphenylyl)-3-butenoic acid chloride in 25 ml of acetone was added dropwise to 50 ml of aqueous 35% methylamine while stirring. The resulting mixture was stirred for 10 minutes more, and then the precipitate which had formed was collected by vacuum filtration and recrystallized from cyclohexane/ethyl acetate, yielding 1.5 gm (55.8% of theory) of the trans-form of the compound of the formula

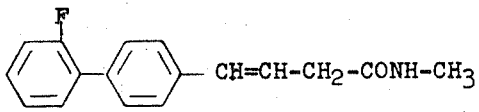

which had a melting point of 135°–136°C.

EXAMPLE 10

Using a procedure analogous to that described in Example 9, 70.5% of theory of trans-4-(2''-fluoro-4'-biphenylyl)-3-butenoic acid ethylamide, m.p. 104°–105°C (recrystallized from cyclohexane), was obtained from trans-4-(2''-fluoro-4'-biphenylyl)-3-butenoic acid chloride and aqueous ethylamine.

EXAMPLE 11

Using a procedure analogous to that described in Example 9, 51% of theory of trans-4-(2''-fluoro-4'-biphenylyl)-3-butenoic acid isopropyl-amide, m.p. 124°–125°C (recrystallized from cyclohexane), was obtained from trans-4-(2''-fluoro-4'-biphenylyl)-3-butenoic acid chloride and aqueous isopropylamine.

EXAMPLE 12

Using a procedure analogous to that described in Example 9, 68% of theory of trans-4-(2''-fluoro-4'-biphenylyl)-3-butenoic acid propylamide, m.p. 107°–109°C (recrystallized from cyclohexane/ethylacetate), was obtained from trans-4-(2''-fluoro-4'-biphenylyl)-3-butenoic acid chloride and aqueous propylamine.

EXAMPLE 13

Using a procedure analogous to that described in Example 8, 77% of theory of trans-4-(2'''-chloro-4'-biphenylyl)-3-butenoic acid amide, m.p. 136°–137°C (recrystallized from aqueous 60% methanol), was obtained from trans-4-(2''-chloro-4'-biphenylyl)-3-butenoic acid chloride and aqueous 30% ammonia.

EXAMPLE 14

Using a procedure analogous to that described in Example 9, 82% of theory of trans-4-(2''-chloro-4'-biphenylyl)-3-butenoic acid methylamide, m.p. 146°–147°C (recrystallized from aqueous 70% methanol), was obtained from trans-4-(2''-chloro-4'-biphenylyl)-3-butenoic acid chloride and aqueous methylamine.

EXAMPLE 15

Trans-4-(2''-fluoro-4'-biphenylyl)-3-butenoic acid (p-hydroxyphenyl)-amide by method E A solution of 5.4 gm of trans-4-(2''-fluoro-4'-biphenylyl)-3-butenoic acid chloride in 25 ml of acetone was added dropwise to a solution of 4.4 gm of 4-amino-phenol in 40 ml of acetone, while stirring. The resulting mixture was stirred for 2.5 hours more and then admixed with water, and the precipitate formed thereby was collected by vacuum filtration and recrystallized from ethanol/water, yielding 6 gm (87% of theory) of the trans-form of the amide of the formula

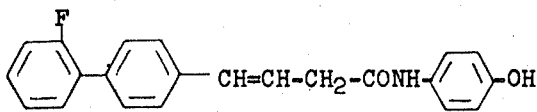

which had a melting point of 172°–173°c.

EXAMPLE 16

Trans-4-(4''-fluoro-4'-biphenylyl)-3-butenoic acid amide by method E

Gaseous ammonia was introduced for 30 minutes into a solution of 11 gm of trans-4-(4''-fluoro-4'-biphenylyl)-3-butenoic acid chloride in 150 ml of benzene, while stirring and cooling, and then the reaction mixture was stirred for 15 minutes more. Thereafter, 600 ml of ethyl acetate were added, the resulting solution was washed with water and filtered through charcoal, and the filtrate was freed from solvent by evaporation. The residue was recrystallized from ethyl acetate, yielding 4.6 gm (45% of theory) of the trans-form of the amide of the formula

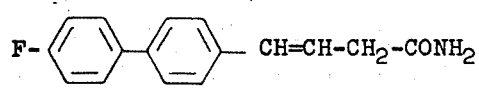

which had a melting point of 223°–224°C.

EXAMPLE 17

Trans-4-(4''-chloro-4'-biphenylyl)-3-butenoic acid amide

A solution of 9 gm of trans-4-(4''-chloro-4'-biphenylyl)-3-butenoic acid chloride (m.p. 96°–97°C) in 50 ml of ether was added dropwise to 250 ml of ether saturated with gaseous ammonia, while stirring. Subsequently, gaseous ammonia was introduced into the reaction solution over a period of 30 minutes, and the mixture was then allowed to stand for 12 hours at room temperature. Thereafter, the precipitate which had formed was collected by vacuum filtration, triturated with water and recrystallized from ethanol, yielding 3 gm (33.4% of theory) of the trans-form of the amide of the formula

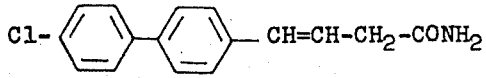

which had a melting point of 224°C.

EXAMPLE 18

Trans-4-(2''-fluoro-4'-biphenylyl)-3-pentenoic acid by method C a. 2-(2''-Fluoro-4'-biphenylyl)-2-methyl-oxirane While keeping a mixture of 820 ml of anhydrous tetrahydrofuran and 820 ml of anhydrous dimethylsulfoxide at 10°–15°C in an atmosphere of nitrogen, first 100.0 gm (0.143 mol) of potassium methylate and then a solution of 293.0 gm (1.44 mols) of trimethylsulfonium iodide in 1040 ml of dry dimethylsulfoxide were added thereto. While maintaining the temperature of the resulting mixture at 10°–15°C, a solution of 123.0 gm (0.57 mol) of 4-acetyl-2'-fluoro-biphenylyl in 1040 ml of dry dimethylsulfoxide was added dropwise over a period of about 1 hour. Thereafter, the reaction mixture was stirred for 30 minutes more and then poured into 15 liters of ice water. The precipitate formed thereby was collected by vacuum filtration, washed with water until neutral, and dried initially in the air and then in a vacuum exsiccator over phosphorus pentoxide, yielding 123 gm (44% of theory) of the oxirane named above which had a melting point of 49°–51°C.

b. 2-(2''-Fluoro-4'-biphenylyl)-propionaldehyde

Without further purification, the 2-(2''-fluoro-4'-biphenylyl)-2-methyl-oxirane (about 0.53 mol) obtained in (a) was dissolved in 850 ml of absolute tetrahydrofuran, the resulting solution was cooled to 10°–15°C and, while maintaining this temperature, it was admixed dropwise in an atmosphere of nitrogen with a solution of 0.5 ml of borontrifluoride etherate in 50 ml of dry tetrahydrofuran. The resulting mixture was stirred for 30 minutes, then admixed with 0.9 ml of dry pyridine and finally evaporated in a water aspirator vacuum, yielding 120 gm (about 99% of theory) of the aldehyde named above which was used in the subsequent condensation reaction (c) without further purification.

c. Trans-4-(2''-fluoro-4'-biphenylyl)-3-pentenoic acid 63.3 gm (0.61 mol) of malonic acid were dissolved in 97 ml of dry pyridine and, after the slightly exothermic reaction had subsided, 123.0 gm (0.54 mol) of 2-(2''-fluoro-4'-biphenylyl)-propionaldehyde and 5.4 ml (0.54 mol) of piperidine were added to the solution. The resulting mixture was refluxed until the evolution of carbon dioxide and subsided, then allowed to cool and subsequently poured into a mixture of ice and concentrated hydrochloric acid in order to wash out the pyridine and piperidine. The resulting aqueous mixture was extracted several times with ether, and the combined ethereal extracts were washed with water, dried over sodium sulfate and evaporated. The residue was recrystallized twice from ethyl acetate/petroleum ether (1:1) and once from ethyl acetate, yielding 64.0 gm (44% of theory) of the trans-form of the acid of the formula

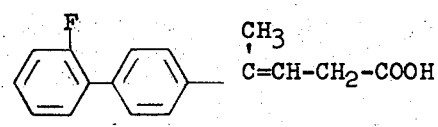

which had a melting point of 147°–148°C.

Its cyclohexylamine salt, obtained by adding cyclohexylamine to a solution of the free acid in acetone, had a melting point of 181°–182°C.

EXAMPLE 19

Using a procedure analogous to that described in Example 1, 82% of theory of trans-4-(2'',4''-difluoro-4'-biphenylyl)-3-butenoic acid, m.p. 171°–172°C (recrystallized from ethyl acetate), of the formula

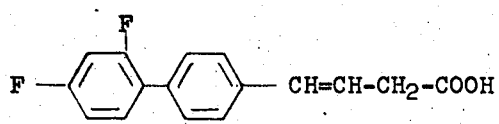

was obtained from the cyclohexylamine salt of 4-(2'',4''-difluoro-4'-biphenylyl)-4-hydroxy-crotonic acid (m.p. 181°–183°C).

The cyclohexylamine salt of the butenoic acid compound had a melting point of 166°–167°C.

NMR-spectrum of the free acid in deuteroacetone: Signals at 6.6 ppm (J = 15 cycles/sec), 6.4 ppm (J = 15 and 6 cycles/sec) and 3.3 ppm (J = 6 cycles/sec) in the ratio 1:1:2.

EXAMPLE 20

Using a procedure analogous to that described in Example 1, 78% of theory of trans-4-(2''-chloro14''-fluoro-4'-biphenylyl)-3-butenoic acid, m.p. 138°–139°C, of the formula

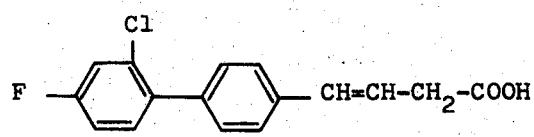

was obtained from the cyclohexylamine salt of 4-(2''-chloro-4''-fluoro-4'-biphenylyl)-4-hydroxy-crotonic acid (m.p. 181°–182°C).

The cyclohexylamine salt of the butenoic acid compound had a melting point of 170°–171°C.

EXAMPLE 21

Using a procedure analogous to that described in Example 7, 86% of theory of trans-4-(2''-cyano-4'-biphenylyl)-3-butenoic acid, m.p. 176°–177°C (recrystallized from a 1:1 mixture of ethyl acetate/tetrachloromethane), of the formula

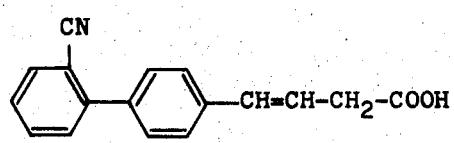

was obtained from the cyclohexylamine salt of 4-(2''-cyano-4'-biphenylyl)-4-hydroxy-butyric acid (m.p. 167°–168°C).

The cyclohexylamine salt of the butenoic acid compound had a melting point of 168°–169°C (recrystallized from ethyl acetate by addition of 10% methanol).

EXAMPLE 22

Using a procedure analogous to that described in Example 1, 21% of theory of trans-4-(3''-fluoro-4'-biphenylyl)-3-butenoic acid of the formula

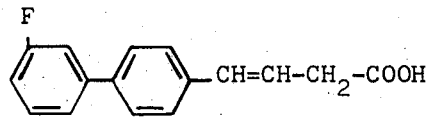

was obtained from the cyclohexylamine salt of 4-(3''-fluoro-4'-biphenylyl)-4-hydroxy-crotonic acid (m.p. 138°–140°C).

The cyclohexylamine salt of the butenoic acid compound had a melting point of 176°–177°C.

EXAMPLE 23

Using a procedure analogous to that described in Example 1, 38% of theory of trans-4-(3''-biphenylyl)-3-butenoic acid, m.p. 149°–151°C, of the formula

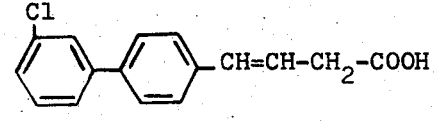

was obtained from 4-(3''-chloro-4'-biphenylyl)-4-hydroxy-crotonic acid (m.p. 122°–123°C).

The cyclohexylamine salt of the butenoic acid compound had a melting point of 165°–166°C (recrystallized from ethyl acetate by addition of ethanol).

EXAMPLE 24

Using a procedure analogous to that described in Example 1, 13% of theory of trans-4-(2',2''-difluoro-4'-biphenylyl)-3-butenoic acid, m.p. 72°–74°C (recrystallized from ethyl acetate/petroleum ether), of the formula

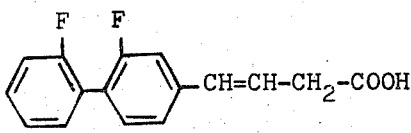

was obtained from the cyclohexylamine salt of 4-(2',2''-difluoro-4'-biphenylyl)-4-hydroxy-crotonic acid (m.p. 159°–161°C).

The cyclohexylamine salt of the butenoic acid compound had a melting point of 166°–167.5°C (recrystallized from acetone in the presence of activated charcoal).

EXAMPLE 25

Using a procedure analogous to that described in Example 1, 44% of theory of trans-4-(2'-fluoro-4'-biphenylyl)-3-butenoic acid, m.p. 127°–129°C, of the formula

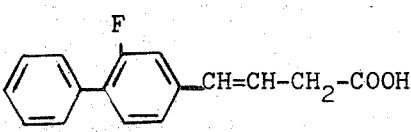

was obtained from 4-(2'-fluoro-4'-biphenylyl)-4-hydroxy-crotonic acid (m.p. 140°–142°C).

The cyclohexylamine salt of the butenoic acid compound had a melting point of 175°–176°C (recrystallized from a 2:8-mixture of methanol and ethyl acetate).

EXAMPLE 26

Trans-4-(3''-chloro-4'-biphenylyl)-3-butenoic acid amide by method E 30.9 gm (0.09 mol) of trans-4-(3''-chloro-4'-biphenylyl)-3-butenoic acid ethyl ester were dissolved in 800 ml of methanol saturated with ammonia, and the resulting solution was heated in an autoclave under an ammonia pressure of 20 atmospheres for 6 hours at 100°C. After cooling, the solvent was distilled out of the reaction mixture, the remainder was admixed with water and acidified with dilute hydrochloric acid, and the aqueous acidic mixture is thoroughly extracted with ethyl acetate. The combined ethyl acetate extracts were successively washed with an aqueous saturated sodium chloride solution and water, dried over sodium sulfate and again evaporated. The oily residue, which crystallized upon being triturated with ethyl acetate, was recrystallized from ethanol and methanol, each in the presence of activated charcoal, yielding 2.0 gm (8% of theory) of the trans-form of the amide of the formula

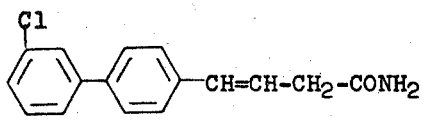

which had a melting point of 186°–188°C.

EXAMPLE 27

Trans-4-(2''-nitro-4'-biphenylyl)-3-butenoic acid and its cyclohexylamine salt by method A A mixture consisting of 4.5 gm (0.0148 mol) of 4-(2''-nitro-4'-biphenylyl)-4-hydroxy-butyric acid (m.p. 113°–115°C) and 13.0 gm (0.113 mol) of pyridine hydrochloride was heated for 2 hours on an oil bath at 180°C. After cooling, the reaction mixture was taken up in a mixture of water and ether and then acidified with hydrochloric acid, and the aqueous phase was thoroughly extracted with ether. The combined ethereal extracts were evaporated to dryness, the residue, trans-4-(2''-nitro-4'-biphenylyl)-3-butenoic acid, was taken up in ethyl acetate, and the resulting solution was admixed with cyclohexylamine. The precipitate formed thereby was collected and recrystallized from isopropanol/ethyl acetate (3:2), yielding 2.9 gm (51% of theory) of the cyclohexylamine salt of the formula

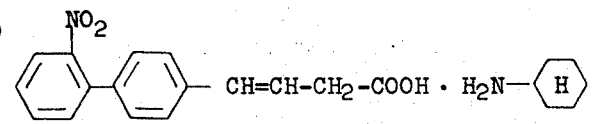

which had a melting point of 151°–153°C.

EXAMPLE 28

Using a procedure analogous to that described in Example 1, trans-4-(4''-fluoro-4'-biphenylyl)-3-butenoic acid, m.p. 198°–199°C (recrystallized from benzene or ethanol), of the formula

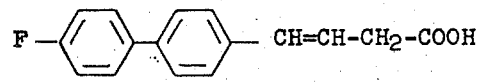

was obtained from 4-(4''-fluoro-4'-biphenylyl)-4-hydroxycrotonic acid (m.p. 180°–181°C).

The cyclohexylamine salt of the trans-butenoic acid compound had a melting point of 175°–176°C (recrystallized from isopropanol). NMR-spectrum in deuterochloroform: Signals at 6.4 ppm (Multiplett) and 3.15 ppm (J not measurable).

From the mother liquors 4.1% of theory of cis-4-(4''-fluoro-4'-biphenylyl)-3-butenoic acid was recovered. The cyclohexylamine salt of the cis-acid had a melting point of 162°–164°C (recrystallized from isopropanol). NMR-spectrum of the cyclohexylamine salt in deuterochloroform: Signals at 6.5 ppm (J = 12 and 2 cycles/sec), at 5.95 ppm (J = 12 and 7 cycles/sec) and at 3.3 ppm (J = 2 and 7 cycles/sec) in the ratio 1:1:2.

EXAMPLE 29

Ethyl trans-4-(2''-fluoro-4'-biphenylyl)-3-butenoate by method D

A solution of 3.00 gm (0.0117 mol) of 4-(2''-fluoro-

4'-biphenylyl)-3-buteonic acid (m.p. 142°C) in 50 ml of dry tetrahydrofuran was admixed at a temperature between −40 and −35°C with 1.19 gm (0.0117 mol) of triethylamine and then, while maintaining the said temperature range, a solution of 1.28 gm (0.0118 mol) of ethyl chloroformate in 10 ml of dry tetrahydrofuran was added dropwise to the mixture. The resulting mixture was then stirred at the indicated low temperature for 1 hour, subsequently allowed to warm to room temperature, then stirred at room temperature for 3 hours and at 40°–45°C for 2 hours, and finally allowed to stand at room temperature overnight. Thereafter, it was refluxed for 1 hour, and the resulting solution was evaporated to dryness in vacuo. The residue was taken up in ether, and the resulting solution was washed with water, dried and again evaporated to dryness. The residue was recrystallized from ethanol, yielding 2.35 gm (71% of theory) of pale yellow leaflets with a melting point of 69.5°–70.5°C which were identified to be the trans-form of the compound of the formula

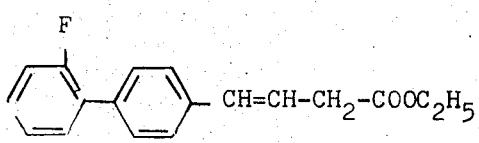

EXAMPLE 29a

Using a procedure analogous to that described in Example 1, 44% of theory of trans-4-(2'-chloro-4'-biphenylyl)-3-butenoic acid, m.p. 131°–132°C (recrystallized from benzene) of the formula

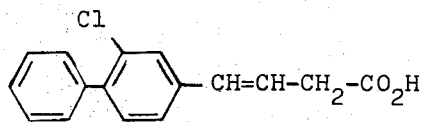

was obtained from 4-(2'-chloro-4'-biphenylyl)-4-hydroxycrotonic acid (m.p. 119°–121°C).

The cyclohexylamine salt of the butenoic acid compound had a melting point of 154°–155°C (recrystallized from ethyl acetate by addition of 5% methanol).

The compounds according to the present invention, that is, those embraced by formula I and their non-toxic salts, have useful pharmacodynamic properties. More particularly, the compounds of the instant invention exhibit antiphlogistic and analgesic activities in warm-blooded animals, such as mice and rats. With respect to the antiphlogistic activity, the compounds according to the present invention are significantly superior to known antiphlogistics of similar structure in that their antiphlogistic action is constant and of exceptionally long duration.

The antiphlogistic activity of the compounds of the present invention was ascertained by the standard test method Hillebrecht described in Arzneimittelforschung 4, 607–614 (1954), i.e. in terms of the antiexudative action against the kaolin-induced adema in the hind paw of rats. The measurements were carried out by the method of Doepfner and Cerletti, Int. Arch. Allergy and Appl. Immunology 12, 89–97 (1958). The data thus obtained were plotted on a dose-activity graph, and from the resulting curve the dose which produces a 35% reduction in the edematons swelling ($ED_{35}$) was graphically calculated for each compound.

The acute toxicities of the compounds ($LD_{50}$) were determined in adult laboratory rats from the percentage of animals which died after administration of varying doses within an observation period of 14 days [see J. Pharmacol. exper. Therap. 96, 99 (1949)].

The following table shows the result of these tests for a representative number of compounds according to the present invention, namely A = Cyclohexylamine salt of trans-4-(2''-fluoro-4'-biphenylyl)-3-butenoic acid;

B = Trans-4-(2''-chloro-4'-biphenylyl)-3-butenoic acid;

C = Cyclohexylamine salt of trans-4-(2''-amino-4'-biphenylyl)-3-butenoic acid;

D = Trans-4-(2''-fluoro-4'-biphenylyl)-3-butenoic acid amide;

E = Trans-4-(2''-chloro-4'-biphenylyl)-3-butenoic acid amide;

F = Cyclohexylamine salt of cis-4-(2''-fluoro-4'-biphenylyl)-3-butenoic acid;

G = Cyclohexylamine salt of trans-4-(3''-chloro-4'-biphenylyl)-3-butenoic acid;

H = Cyclohexylamine salt of trans-4-(2''-chloro-4'-biphenylyl)-3-butenoic acid; and I = Cyclohexylamine salt of trans-4-(2''-fluoro-4'-biphenylyl)-3-butenoic acid.

| Compound | $ED_{35}$ mgm/lg p.o. | $LD_{50}$ mgm/kg p.o. |
|---|---|---|
| A | 31 | >1,000 |
|   |    | (0 out of 10 animals died) |
| B | 41 | — |
| C | 22 | >1,000 |
|   |    | (3 out of 10 animals died) |
| D | 38 | >500 |
|   |    | (0 out of 10 animals died) |
| E | 51 | >1,000 |
|   |    | (0 out of 10 animals died) |
| F | 20 | — |
| G | 43 | 1,840 |
| H | 34 | — |
| I | 27 | — |

The analgesic activity of the compounds of the instant invention was ascertained by means of the writhing test.

For pharmaceutical purposes the compounds according to the present invention are administered to warm-blooded animals perorally or parenterally as active ingredients in customary dosage unit compositions, that is, compositions in dosage unit form consisting essentially of an inert pharmaceutical carrier and one effective dosage unit of the active ingredient, such as tablets, coated pills, capsules, wafers, powders, solutions, suspensions, emulsions, syrups, suppositories and the like. On effective dosage unit of the compounds according to the present invention is from 0.83 to 6.7 mgm/kg, preferably 1.3 to 5.0 mgm/kg body weight, and the daily dose rate is 1.6 to 16.7 mgm/kg body weight.

The following examples illustrate a few pharmaceutical dosage unit compositions comprising a compound of the present invention as an active ingredient and represent the best modes contemplated of putting the invention into practical use. The parts are parts by weight unless otherwise specified.

EXAMPLE 30

Tablets

The tablet composition is compounded from the following ingredients:

| | | |
|---|---|---|
| Trans-4-(2''-fluoro-4'-biphenylyl)-3-butenoic acid | 200.0 | parts |
| Corn starch | 97.0 | do. |
| Polyvinylpyrrolidone | 10.0 | do. |
| Magnesium stearate | 3.0 | do. |
| Total | 310.0 | parts |

Preparation:

The butenoic acid compound is admixed with the corn starch, the mixture is granulated with an aqueous 14% solution of the polyvinylpyrrolidone through a 1.5 mm-mesh screen, the granulate is dried at 45°C and again passed through the screen, the dry granulate is admixed with the magnesium stearate, and the composition is compressed into 310 mgm-tablets with the aid of a conventional tablet making machine. Each tablet contains 200 mgm of the butenoic acid compound and is an oral dosage unit composition with effective analgesic and antiphlogistic action.

EXAMPLE 31

Coated Pills

The pill core composition is compounded from the following ingredients:

| | | |
|---|---|---|
| Trans-4-(2''-fluoro-4'-biphenylyl)-3-butenoic acid | 300.0 | parts |
| Corn starch | 70.0 | do. |
| Gelatin | 8.0 | do. |
| Talcum | 18.0 | do. |
| Magnesium stearate | 4.0 | do. |
| Total | 400.0 | parts |

Preparation:

The butenoic acid compound is admixed with the corn starch, the mixture is granulated with an aqueous 10% solution of the gelatin through a 1.5 mm-mesh screen, the granulate is dried at 45°C and again passed through the screen, the dry granulate is admixed with the talcum and the magnesium stearate, and the composition is compressed into 400 mgm-pill cores. These cores are subsequently coated in conventional manner with a thin shell consisting essentially of a mixture of talcum and sugar, and finally polished with beeswax. Each coated pill contains 300 mgm of the butenoic acid compound and is an oral dosage unit composition with effective analgesic and antiphlogistic action.

EXAMPLE 32

Gelatin Capsules

The capsule filler composition is compounded from the following ingredients:

| | | |
|---|---|---|
| Trans-4-(2''-fluoro-4'-biphenylyl)-3-butenoic acid | 200.0 | parts |
| Corn starch | 190.0 | do. |
| Colloidal silicic acid | 6.0 | do. |
| Magnesium stearate | 4.0 | do. |
| Total | 400.0 | parts |

Preparation:

The ingredients are intimately admixed with each other, and 400 mgm-portions of the mixture are filled into No. 1 gelatin capsules. Each capsule contains 200 mgm of the butenoic acid compound and is an oral dosage unit composition with effective analgesic and antiphlogistic action.

EXAMPLE 33

Suppositories

The suppository composition is compounded from the following ingredients:

| | |
|---|---|
| Trans-4-(2''-fluoro-4'-biphenyl)-3-butenoic acid | 300.0 parts |
| suppository base (e.g. cocoa butter) | 1450.0 parts |
| Total | 1750.0 parts |

Preparation:

The finely pulverized butenoic acid compound is homogeneously blended with the aid of an immersion homogenizer into the suppository base which has previously been melted and cooled to 40°C. 1750 mgm-portions of the mixture are poured at 37°C into cooled suppository molds and allowed to harden therein. Each suppository contains 300 mgm of the butenoic acid compound and is a rectal dosage unit composition with effective analgesic and antiphlogistic action.

EXAMPLE 34

Hypodermic solution

The solution is compounded from the following ingredients:

| | | |
|---|---|---|
| Trans-4-(2''-fluoro-4'-biphenylyl)-3-butenoic acid | | 150.0 parts |
| 1N Sodium hydroxide | q.s.ad | pH 9.0 |
| Distilled water | q.s.ad | 3000.0 ''by vol. |

Preparation:

The butenoic acid compound is suspended in a sufficient amount of distilled water and caused to go into solution by addition of the sodium hydroxide until pH 9. The solution is diluted to the indicated volume with additional distilled water, filtered until free from suspended particles, and the filtrate is filled into 3 ml-ampules which are sterilized for 20 minutes at 120°C and then sealed. Each ampule contains 150 mgm of the butenoic acid compound, and the contents thereof are an injectable dosage unit composition with effective analgesic and antiphlogistic action.

EXAMPLE 35

Suspension

The suspension is compounded from the following ingredients:

| | | |
|---|---|---|
| Trans-4-(2''-fluoro-4'-biphenylyl)-3-butenoic acid | 4.0 | parts |
| Dioctyl sodium sulfosuccinate (DONSS) | 0.02 | do. |
| Benzoic acid | 0.1 | do. |
| Sodium cyclamate | 0.2 | do. |
| Colloidal silicic acid | 1.0 | do. |
| Polyvinylpyrrolidone | 0.1 | do. |
| Glycerin | 25.0 | do. |
| Grapefruit flavoring | 0.1 | do. |
| Distilled water q.s.ad | 100.0 | do. by vol. |

Preparation:

A sufficient amount of distilled water is heated to 70°C, and the DONSS, the benzoic acid, the sodium cyclamate and the polyvinylpyrrolidone are successively dissolved therein. The glycerin and the colloidal silicic acid are added to the solution, and the finely pulverized butenoic acid compound is suspended in the mixture with the aid of an immersion homogenizer. Finally, the flavoring is added and the suspension is diluted to the indicated volume with distilled water. 5 ml of the suspension contain 200 mgm of the butenoic acid compound and are an oral dosage unit composition with effective analgesic and antiphlogistic action.

Analogous results are obtained when any one of the other compounds embraced by formula I, or a non-toxic salt thereof, is substituted for the particular butenoic acid compound in Examples 30 through 35. Likewise, the amount of active ingredient in these illustrative examples may be varied to achieve the dosage unit range set forth above, and the amounts and nature of the inert pharmaceutical carrier ingredients may be varied to meet particular requirements.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

We claim:

1. A compound of the formula

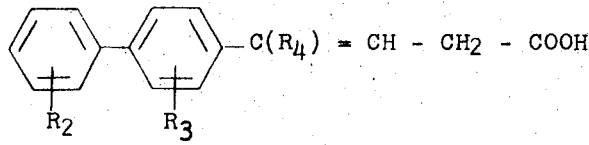

wherein
R$_2$ is halogen, nitro or, when R$_3$ is halogen, also hydrogen,
R$_3$ is hydrogen or halogen, and
R$_4$ is hydrogen, methyl or ethyl,
or a non-toxic salt thereof with a pharmaceutically acceptable inorganic or organic base.

2. A compound of claim 1 which is of the formula

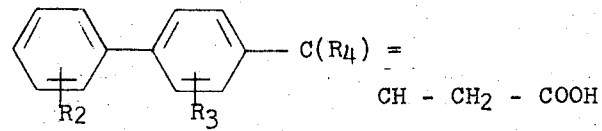

wherein
R$_2$ is fluorine, chlorine or, where R$_3$ is fluorine or chlorine, also hydrogen, and
R$_3$ is hydrogen, fluorine or chlorine, or a non-toxic salt thereof with a pharmaceutically acceptable inorganic or organic base.

3. A compound of claim 1 which is trans-4-(2''-fluoro-4'-biphenylyl)-3-butenoic acid or a non-toxic salt thereof with a pharmaceutically acceptable inorganic or organic base.

4. A compound of claim 1 which is cis-4-(2''-fluoro-4'-biphenylyl)-3-butenoic acid or a non-toxic salt thereof with a pharmaceutically acceptable inorganic or organic base.

5. A compound of claim 1 which is trans-4-(2'-fluoro-4'-biphenylyl)-3-butenoic acid or a non-toxic salt thereof with a pharmaceutically acceptable inorganic or organic base.

6. A compound of claim 1 which is trans-4-(2''-chloro-4'-biphenylyl)-3-butenoic acid or a non-toxic salt thereof with a pharmaceutically acceptable inorganic or organic base.

7. A compound of claim 1 which is trans-4-(2'-chloro-4'-biphenylyl)-3-butenoic acid or a non-toxic salt thereof with a pharmaceutically acceptable inorganic or organic base.

8. A compound of claim 1 which is trans-4-(2',2'''-difluoro-4'-biphenylyl)-3-butenoic acid or a non-toxic salt thereof with a pharmaceutically acceptable inorganic or organic base.

9. A compound of claim 1 which is trans-4-(4''-fluoro-4'-biphenylyl)-3-butenoic acid or a non-toxic salt thereof with a pharmaceutically acceptable inorganic or organic base.

10. A compound of claim 1 which is trans-4-(2'',3''-dichloro-4'-biphenylyl)-3-butenoic acid or a non-toxic salt thereof with a pharmaceutically acceptable inorganic or organic base.

11. A compound of claim 1 which is trans-4-(2'',3''-difluoro-4'-biphenylyl)-3-butenoic acid or a non-toxic salt thereof with a pharmaceutically acceptable inorganic or organic base.

12. A compound of claim 1 which is trans-4-(3''-chloro-4'-biphenylyl)-3-butenoic acid or a non-toxic salt thereof with a pharmaceutically acceptable inorganic or organic base.

13. Trans-4-(2'-fluoro-4'-biphenylyl)-3-butenoic acid or its cyclohexylamine salt.

* * * * *